Patented Apr. 20, 1954

2,676,172

UNITED STATES PATENT OFFICE 2,676,172

ALLYL DEXTRINS

John Robert Roach, St. Paul, and Robert Nordgren, Minneapolis, Minn., assignors to General Mills, Inc., a corporation of Delaware No Drawing. Application August 4, 1950,
Serial No. 177,765

6 Claims. (Cl. 260—209)

The present invention relates to allyl dextrins soluble in a wide variety of organic solvents and having a degree of substitution of from 1.6 to 1.85 allyl groups per glucose unit preferably from 1.7 to 1.85 allyl groups per glucose unit. The invention also relates to a method of preparing such products from dextrins which are from 75% to 100% soluble in water and which form a 20% aqueous solution by weight having a viscosity range of 3 to 20 centistokes at 25° C.

Present day lacquer research is concerned with the production of lacquers which contain higher solids contents than the 20% solids typical of most lacquers. The allyl dextrins of the present invention are particularly useful in preparation of such lacquers inasmuch as they are capable of being dissolved in a wide variety of organic solvents to form lacquer solutions of high solids at applicable viscosities, and also permitting the attainment of varied drying rates through proper choice of solvent.

Various attempts have been made to produce allyl ethers of carbohydrates which would be useful in protective coating compositions. These have, in general, however, been subject to numerous disadvantages. Allyl ethers of undegraded starch require a high degree of allylation in order to give them commercially acceptable solubility in organic solvents. Usually a degree of allylation in excess of 2 allyl groups per glucose unit is required to obtain this solubility. It will be apparent that even an allyl starch containing on the average considerably less than 2 allyl groups per glucose unit will contain some molecules which are highly allylated and which, therefore, will be soluble in organic solvents. However, the major portion of the allyl starch will be insoluble and will be present in the form of a gel. Accordingly it has been considered necessary to allylate starch to the extent that it possesses in excess of 2 allyl groups per glucose unit on the average in order to obtain a commercially acceptable solubility. It has been found, however, that these allyl ethers of undegraded starch, when they possess sufficient allyl groups to be soluble, produce solutions of very high viscosity at relatively low solids content and are of little use for the production of protective coatings. Furthermore, the production of these high degrees of allylation have necessitated the employment of large excesses of allylating agent. Thus Nichols et al., Ind. Eng. Chem. 37, 201 (1945), describe the preparation of allyl starch from undegraded starch by the employment of more than a 600% excess of allyl chloride to produce products having a degree of substitution in most instances of 2 or more.

Nichols et al. also report the preparation of an allyl ether of "standard tapioca dextrin" having a degree of substitution of 2.0. The dextrin employed by Nichols et al., however, has been degraded very extensively and was of an entirely different character from the dextrins employed herein. Thus Nichols et al. report that the standard tapioca dextrin which they employed had a viscosity of 8.5 centistokes in a 50% aqueous solution at 130° F. The degree of degradation of this dextrin is indicated by the fact that a 50% aqueous solution of dextrose has a viscosity of 2.8 centistokes at 130° F., whereas a typical dextrin employed in the present invention has a viscosity of over 15,000 centistokes at 130° F. in a 50% aqueous solution. Allyl dextrins of the type reported by Nichols et al. are liquids at ordinary temperature and therefore are not suitable for applications which require drying by evaporation of solvent to produce tack-free films.

Attempts have also been made to prepare allyl starch from unmodified starch and then to subject the allyl starch to a hydrolysis procedure for the purpose of reducing the molecular size (Talley et al., U. S. D. A. Report AIC—140, 1947). However it is virtually impossible to prepare uniform products by this procedure since hydrolysis is carried out to the point where the allyl derivative is observed to be soluble in the solvent present in the reaction mixture. Such reaction mixtures contain crystalline sodium chloride, and accordingly adequate control of the hydrolysis on the basis of the visual solubility of the allyl derivative is not possible. Moreover, the allyl derivative of starch thus prepared produces solutions having limited stability as is evidenced by the tendency for gelled material to settle out after short periods of time at room temperature. This is indicative of the presence of heterogeneous molecules, the higher molecular weight molecules being of sufficient size that they will not tolerate any extensive polymerization before gelation results.

In contrast to the above described products, the present invention makes possible the production of allyl ethers of certain selected dextrins which show excellent solubility in organic solvents at a low degree of allylation. For example, an allyl dextrin has been produced which has a degree of allylation as low as 1.6 and which demonstrates excellent solubility in a wide variety of organic solvents including low molecular weight alcohols, esters, ketones, chlorinated hydrocarbons, nitroparaffins, aromatic hydrocarbons (in the presence of a few percent of hydrogen-bond forming solvents such as alcohols), ether alcohols such as the cellosolves and carbitols, and glycols (in some instances a small amount of a strong solvent such as ethylene glycol monobutyl ether may be necessary in order to effect solution in the glycol). In general these solvents will produce solutions of acceptable solids content at acceptable viscosities. Thus most of the solvents mentioned above will have viscosities within the range of 40-230 centistokes at 25° C. for a 40% solution. The viscosity varies somewhat with the particular solvent. For example, toluene solutions have lower viscosities than comparable solutions in glycols.

Not only are the prior allyl ethers subject to numerous disadvantages, but also the processes heretofore disclosed for preparing such ethers have left much to be desired. For example, Nichols et al not only employed a very large excess of allyl chloride which made the cost prohibitive and complicated recovery problems, but they also found it necessary to conduct the reaction in the presence of a large volume of acetone as a solvent. When they conducted the reaction in the absence of a solvent an insoluble product was obtained even though the product had a degree of allylation of 2.6. According to the present method, not only is it unnecessary to use a solvent for the reaction, but it is actually undesirable since its use introduces solvent by-product recovery problems, as well as purification problems. When acetone is used as a solvent considerable amounts of acetone condensation products, namely mesityl oxide and phorone, are formed. These are high boiling, water insoluble solvents which are extremely difficult to remove from the allyl dextrin. The absorption of these condensation products by the allyl dextrin lowers the softening range, greatly increasing the problem of drying the allyl dextrin.

As compared to the Talley et al. process, the present process makes possible a reaction mixture which has a less viscous consistency, thereby greatly decreasing the difficulties in stirring the mixture, as well as decreasing the power requirements. Allylation of undegraded starches as disclosed by Talley et al. require the addition of excess allyl chloride in the presence of solvents, not only to decrease polymerization, but also to enable adequate mixing, made difficult by what would otherwise be a practically solid reaction mixture. Another method (Hamilton et al., U. S. Patent 2,406,396) requires the complete acylation of the starch prior to the allylation reaction. This process not only involves the use of acetone as a solvent, but also requires a two-step process.

In contrast to these prior methods of making allyl starches and allyl dextrins, the present invention provides a simple process of producing allyl dextrins which involves the simple dispersion of the dextrin in an aqueous alkali to which dispersion a suitable quantity of allyl chloride is added. The reaction is then conducted for a suitable period of time, after which the allyl ether and allyl alcohol by-products are removed by steam distillation and the allyl dextrin product recovered after a simple water washing operation.

It is therefore an object of the present invention to provide novel allyl dextrin products having a degree of allylation within the approximate range of 1.6 to 1.85 allyl groups per glucose unit, said allyl dextrin being prepared from dextrins which are from 75-100% soluble in water and which form 20% aqueous solutions by weight having a viscosity within the range of 3 to 20 centistokes at 25° C.

It is another object of the present invention to provide allyl ethers of soluble dextrins, the allyl ethers being characterized by excellent solubility in a wide variety of organic solvents to produce solutions of high concentration at low viscosities.

It is another object of the present invention to provide an improved process of producing such ethers.

The selection or preparation of the proper dextrin for use in the present invention is of greatest importance. Starch from any source may be used, but it must be modified through conventional dextrinization procedures to a degree where it is from 75-100% soluble in water and such that a 20% solution by weight in water will have a viscosity of approximately 3 to 20 centistokes at 25° C.

For purposes of the present invention the solubility of the dextrin is determined as follows: A 1 gram sample of dextrin is weighed into a 100 ml. volumetric flask and dissolved in slightly less than 100 ml. of water. The flask is allowed to stand for three hours, with intermittent shaking, at 25° C. Thereafter the solution is centrifuged in a laboratory centrifuge until the supernatant is clear. Aliquot samples (20 ml.) of the supernatant are then evaporated first on a steam bath and then in a vacuum oven at a temperature of 50° C. overnight. The weight of the residue represents the soluble portion of the original dextrin.

If the dextrin is less than 75% soluble in water, the resulting allyl dextrin will have unacceptable solubility in organic solvents at the most economical degree of substitution, namely with a degree of substitution of 1.6 to 1.85. Of the dextrins which are 100% soluble in water, those which produce a 20% aqueous solution by weight having a viscosity in the approximate range of 3 to 20 centistokes at 25° C. are satisfactory. Dextrins which are degraded more than this degree result in allyl dextrins with a lower softening range and actually some of the allyl dextrins may even be liquids. The allyl dextrins of lower softening range present great difficulties in drying as a result of the tendency of the wet product to cake and lump upon being dried by application of heat by conventional methods. By employing dextrins of the type herein specified, the allyl dextrins obtained have a softening range of approximately 80-100° C. This permits the preparation of dry allyl dextrin without difficulty and also permits the formation of tack-free films merely by the evaporation of solvent. These allyl dextrins produce absolute ethanol solutions containing 30 g. of allyl dextrin solids per 100 ml. of solution which have a viscosity of 10 to 60 centistokes at 25° C. The concentrations of these solutions are referred to hereinafter as 30% solids by volume.

The allyl dextrins are prepared as follows: The dextrin is mixed with aqueous alkali until the dextrin is uniformly dispersed. The length of time required depends upon the volume of reactants and the degree of agitation, but the mixing usually is complete in from 15 to 30 minutes. The reaction is exothermic and the temperature should not be permitted to exceed 100° C. As the alkali, an aqueous solution of alkali metal hydroxide such as sodium or potassium hydroxide of 50-75% concentration by weight should be used. Providing the agitation during allylation is adequate, the most efficient use of allyl chloride is obtained at the higher alkali concentrations. In general, alkali concentrations of 55-75% produce better results than 50% concentration. The amount of sodium hydroxide should be stoichiometrically equivalent to the allyl chloride or approximately a 5% excess may be used. For economic reasons a larger excess is not used.

After the alkali and the dextrin have been mixed, the allyl chloride may either be added all at one time and the mixture brought to the reaction temperature, or the alkali-dextrin may be heated to the reaction temperature and the allyl chloride pumped in over a period of time not exceeding approximately two hours. During the reaction good agitation is essential. The reaction time is generally from 3 to 5 hours at temperatures of 85–110° C. The reaction is carried out in an autoclave to prevent loss of allyl chloride.

When the reaction has been completed as evidenced by a pressure drop to an approximately constant value, water is added to the reaction mixture and by-products, namely allyl ether and allyl alcohol, as well as any unreacted allyl chloride, are removed by steam distillation. The product is then removed from the kettle and washed with water to remove the remaining small amount of alkali and the sodium chloride. During the washing procedure the product is neutralized to a pH of 5 to 6 with a dilute acid such as acetic or hydrochloric, in order to simplify the removal of sodium hydroxide and to prevent dispersion of allyl dextrin in water at pH values closer to neutrality. The product is then dried by conventional methods. When dextrins of the type herein specified are used, this drying presents no difficulty. However, when an attempt is made to use dextrins which have been degraded further than our preferred range, allyl dextrins are produced which, when wet with water, are gummy and sticky at room temperature and defy drying by conventional or practical procedures.

The preferred reaction involves the dispersion of a dextrin which is 90% to 100% soluble in water and which forms a 20% aqueous solution by weight having a viscosity of from 3 to 10 centistokes at 25° C., in a sodium hydroxide solution containing from 55–60% sodium hydroxide by weight. Thereafter 1.0 to 1.3 moles of allyl chloride per hydroxyl equivalent of dextrin is added and the reaction carried on at temperatures of from 90–100° C. for a period of approximately 3 hours. This results in the production of allyl dextrins containing approximately 1.75 to about 1.85 allyl groups per glucose unit, the allyl dextrins forming an absolute ethanol solution containing 30% allyl dextrin solids by volume having a viscosity in the range of 10 to 20 centistokes at 25° C.

The products of the present invention are adapted for numerous uses in the coating field. By virtue of the unsaturation in the allyl dextrin molecule, the compounds readily polymerize through the catalytic action of oxygen or heat. The polymers thus obtained demonstrate excellent solvent resistance. Allyl dextrin films by themselves do not demonstrate sufficient flexibility for use as coatings except on rigid objects. In most instances it is necessary to add a plasticizer or a plasticizing resin in order to provide the flexibility which is usually necessary. This may readily be accomplished since the allyl dextrins of the present invention are compatible with a large number of plasticizers and plasticizing resins, as well as a variety of other resins. Some of these materials are as follows: phthalate esters, such as dibutyl phthalate, dioctyl phthalate; phosphate esters, such as tricresyl phosphate, cresyl diphenyl phosphate (Santicizer 140), and alkyl-aryl phosphates (Santicizer 141); numerous sulfonamides, such as N-ethyl benzene sulfonamide, mixture of N-ethyl ortho- and para-toluene sulfonamides (Santicizer 8), mixture of ortho- and para-toluene sulfonamides (Santicizer 9); short oil length alkyds; phenolic modified alkyds; urea formaldehyde resins; melamine formaldehyde resins; phenol formaldehyde resins; rosin derivatives; nitrocelluloses, etc.

Lacquers can be prepared from allyl dextrins of the present invention, at high solids contents and the films resulting from the use of such lacquers possess excellent solvent resistance, gloss, hardness, mar resistance, and cold check resistance. Similar lacquer vehicles may be used for the preparation of rapid drying enamels and metallic paints with the above mentioned properties.

Allyl dextrins of the present invention have excellent solubility in ethanol and such solutions of allyl dextrin hold considerable promise as a replacement for shellac in many applications in view of the rapid drying characteristics thereof to yield a tack-free film. Among these applications are: a sealer for wood, in aniline and steam-set inks, and as an adhesive or binder. Allyl dextrins are also useful as metal coatings, gloss and protective coatings for paper, solvent-resistant and mar-resistant coating for various plastics.

*Example 1*

A series of allyl dextrins were made starting with dextrins of varying solubilities to demonstrate the effect of the solubility of the dextrin upon the solubility of the allyl dextrin in organic solvents.

The general procedure involved mixing 254–264 g. (depending upon the moisture content; 243 g. on dry basis) of the dextrin or modified starch with 558 g. of 50% aqueous sodium hydroxide. The mixing was carried out in a one-gallon stainless steel autoclave, fitted with an anchor-type stirrer with the stirring rate being approximately 150 R. P. M. The mixture was stirred at approximately room temperature for fifteen minutes and then the allyl chloride (513 g.) was added, the autoclave closed and the reaction carried out at 90° C. for 3–5 hours, with most of the runs being completed in 4 hours. The autoclave was cooled, approximately 1 liter of water was added, the mixture was neutralized (required 10–25 cc. of glacial acetic acid to neutralize) and the by-products and excess allyl chloride were removed by steam distillation. The resulting allyl dextrin was then washed with hot water (approximately 70° C.) to remove salts and was then dried by conventional means. For analytical purposes, pulverized allyl dextrin was dried in vacuo by heating for a few hours at 50–70° C. or overnight at 40° C.

The results of these experiments have been tabulated in the following table:

| Solubility of Dextrin | Solubility of Resulting Allyl Dextrin in Organic Solvents |
| --- | --- |
| 75% | Fair solubility. |
| 79% | Good. |
| 89.1% | Do. |
| 91% | Do. |
| 93–4% | Do. |
| 98.1% | Do. |
| 98.7% | Do. |
| 100% | Do. |
| 100% | Do. |
| 100% | Do. |
| 27.4% | Insoluble. |
| 10% [1] | Do. |
| 50% [1] | Do. |

[1] Reaction same except that Monel metal autoclave used.

Example 2

The procedure of Example 1 was duplicated with a series of dextrins and the following results were obtained which demonstrate the fact that dextrins having the viscosities within the range herein specified produce allyl dextrins having acceptable viscosities. The products listed in the table all presented high softening ranges and could be dried readily in commercial equipment.

| Solubility of Dextrin | Visc. of 20% Aq. Solution of Dextrin, Centistokes | Visc. of 30% Ethanol Solution of Allyl Dextrin, Centistokes |
|---|---|---|
| 100% | 4-6 | 18.5 |
| 100% | 6.31 | 15.1 |
| 100% | 16.1 | 44.7 |
| 98.1% | 5.38 | 27.2 |
| 92.8% | 3.33 | 11.9 |

Example 3

In Examples 1 and 2 the allyl dextrins were prepared from a mixture containing an equivalent ratio of dextrin hydroxyl:allyl chloride:alkali of 1.0:1.5:1.55. A series of allyl dextrins were prepared from a dextrin which was 99–100% soluble and which produced a 20% aqueous solution having a viscosity of 5 centistokes at 25° C. The dextrin was reacted with varying ratios of allyl chloride, other reaction conditions being the same as those set forth in Example 1. The following table illustrates the ratio of allyl chloride to dextrin hydroxyl and the degree of allylation obtained:

| Allyl Chloride:Dextrin Hydroxyl Ratio | D. S. of Allyl Dextrin |
|---|---|
| 1.5 | 1.75-1.85 |
| 1.4 | 1.71 |
| 1.3 | 1.66 |
| 1.2 | 1.60 |
| 1.1 | 1.59 |

These products all demonstrate the same excellent solubility in the usual organic solvents referred to above, and in general possess the desired characteristics described herein.

Example 4

Example 3 was duplicated with the exception that sodium iodide was used as an etherification catalyst in a quantity of 1% based on the weight of the dextrin. The following table illustrates the efficiency of the sodium iodide at the lower allyl chloride:dextrin hydroxyl ratio. In addition to providing slightly higher degrees of substitution, the sodium iodide also results in an allyl dextrin with slightly better over-all solubility which is believed to be due to a more uniform distribution of allyl groups throughout the anhydro-gluco chain of the dextrin molecule.

| Allyl Chloride:Dextrin Hydroxyl Ratio | D. S. of Allyl Dextrin |
|---|---|
| 1.5 | 1.7-1.8 |
| 1.4 | 1.72 |
| 1.3 | 1.72 |
| 1.2 | 1.73 |
| 1.1 | 1.64 |
| 1.0 | 1.65 |

Example 5

All of the examples hereinbefore described have been carried out with 50% aqueous sodium hydroxide as the alkaline constituent. It has been found that the use of aqueous alkali of more than 50% concentration results in a more efficient use of allyl chloride. However the use of higher alkali concentrations is attendant with more viscous reaction mixtures requiring more power for adequate agitation, and it appears that sodium hydroxide of about 75% concentration is the approximate maximum concentration which may be used advantageously. A series of allyl dextrins were prepared from a dextrin described in Example 3 employing varying concentrations of alkali and varying ratios of allyl chloride. These experiments were all conducted on 300-pound batches of dextrin and demonstrate what may be expected in commercial practice. The following table illustrates the fact that higher degrees of substitution may be obtained for a given amount of allyl chloride when the alkali concentration is increased:

| Alkali Concentration | Allyl Chloride/Dextrin Hydroxyl Ratio | D. S. |
|---|---|---|
| 50% | 1.59 | 1.73-1.77 |
| 53.0% | 1.59 | 1.80 |
| 53.0% | 1.59 | 1.80 |
| 53.0% | 1.49 | 1.80 |
| 53.0% | 1.46 | 1.80 |
| 53% | 1.43 | 1.82 |
| 55% | 1.43 | 1.84 |
| 55% | 1.34 | 1.79 |
| 55% | 1.28 | 1.77 |
| 55% | 1.27 | 1.73 |

While various modifications have been described, it will be apparent that other modifications are possible without departing from the spirit of the invention. The invention is applicable to dextrins in general, and typical dextrins which can be used in accordance with previous detailed descriptions include corn, wheat, rice, potato, tapioca, and mandioca dextrins. The amount of allyl chloride which may be used can be varied from approximately 1.0 to 1.5 moles per hydroxyl equivalent of the dextrin. The reaction temperature may be varied within the range of 85–110° C. and the time from 3 to 5 hours. In most instances 4 hours is adequate for the reaction.

We claim as our invention:

1. Process of preparing allyl dextrins containing from 1.6 to 1.85 allyl groups per glucose unit, which comprises reacting dextrins which are from 75% to 100% soluble in water and which form 20% aqueous solutions by weight having a viscosity within the range of 3 to 20 centistokes at 25° C., with an aqueous solution of an alkali metal hydroxide containing from 50% to 75% alkali metal hydroxide by weight, in the presence of from 1.0 to 1.5 moles of allyl chloride per hydroxyl equivalent of the dextrin, at temperatures of from 85–110° C. for a time period of from 3 to 5 hours.

2. Process of preparing allyl dextrins containing from 1.6 to 1.85 allyl groups per glucose unit, which comprises mixing a dextrin which is from 75% to 100% soluble in water and which forms a 20% aqueous solution by weight having a viscosity of from 3 to 20 centistokes at 25° C., in an aqueous solution of an alkali metal hydroxide containing from 50% to 75% of alkali metal hydroxide by weight, thoroughly mixing the resultant mixture while maintaining the temperature not substantially in excess of 100° C., continuing the mixing until the mixture is substantially uniform, thereafter adding from 1.0 to 1.5 moles of allyl chloride per hydroxyl equivalent in the dextrin, agitating the reaction mixture, and maintaining the reaction mixture at a temperature of 85-110° C. for 3 to 5 hours.

3. Process of preparing allyl dextrins containing from 1.6 to 1.85 allyl groups per glucose unit, which comprises mixing a dextrin which is from 75% to 100% soluble in water and which forms a 20% aqueous solution by weight having a viscosity of from 3 to 20 centistokes at 25° C., in an aqueous solution of an alkali metal hydroxide containing from 50% to 75% of alkali metal hydroxide by weight, thoroughly mixing the resultant mixture while maintaining the temperature not substantially in excess of 100° C., continuing the mixing until the mixture is substantially uniform, thereafter adding allyl chloride in the proportion of from 1.0 to 1.5 moles per hydroxyl equivalent of the dextrin, gradually over a period of time not exceeding approximately 2 hours, maintaining the reaction mixture agitated during the addition of the allyl chloride and thereafter, the reaction mixture being at a temperature within the range of 85-110° C. and the time period from the beginning of the addition of the alyl chloride to the completion of the reaction being from 3 to 5 hours.

4. Process according to claim 1 in which the reaction mixture after completion of the reaction is diluted with water and the by-products allyl ether and allyl alcohol are removed by steam distillation, following which the product is washed with water and dried.

5. Process according to claim 1 in which the reaction mixture after completion of the reaction is diluted with water and the by-products allyl ether and allyl alcohol are removed by steam distillation, following which the product is washed with water, and dried, the product being neutralized to a pH of from 5 to 6 during the course of the washing operation.

6. Process of producing allyl dextrins containing from 1.75 to 1.85 allyl groups per glucose unit, which comprises reacting dextrins which are 90% to 100% soluble in water and which form a 20% aqueous solution by weight having a viscosity of 3 to 10 centistokes at 25° C., in an aqueous solution of an alkali metal hydroxide containing 55% to 60% alkali metal hydroxide, in the presence of 1.0 to 1.2 moles of allyl chloride per hydroxyl equivalent of the dextrin at temperatures of from 90-100° C. for a period of about 3 hours.

References Cited in the file of this patent

UNITED STATES PATENTS

| Number | Name | Date |
|---|---|---|
| 2,406,369 | Hamilton et al. | Aug. 27, 1946 |
| 2,413,463 | Nichols et al. | Dec. 31, 1946 |
| 2,524,792 | Hamilton et al. | Oct. 10, 1950 |